United States Patent [19]

Huelle et al.

[11] 4,323,220

[45] Apr. 6, 1982

[54] ACTUATING APPARATUS FOR ADJUSTING A MOVABLE ELEMENT, PARTICULARLY THE CLOSURE MEMBER OF A VALVE

[75] Inventors: Zbigniew R. Huelle, Sonderborg; Leif Nielsen, Nordberg, both of Denmark

[73] Assignee: Danfoss A/S, Nordborg, Denmark

[21] Appl. No.: 214,567

[22] Filed: Dec. 8, 1980

Related U.S. Application Data

[62] Division of Ser. No. 956,573, Nov. 1, 1978, Pat. No. 4,258,899.

[51] Int. Cl.³ .................... F16K 31/02; F03G 7/06
[52] U.S. Cl. .................................... 251/11; 60/531; 236/68 R
[58] Field of Search .................. 251/11, 25, 62, 63.5, 251/38, 45; 236/68 R; 60/531

[56] References Cited

U.S. PATENT DOCUMENTS

| | | |
|---|---|---|
| 1,711,403 | 4/1929 | Boger ................................... 251/11 |
| 1,905,683 | 4/1933 | Carraway ............................. 251/11 |
| 3,168,805 | 2/1965 | Fleury .................................. 251/11 |
| 3,500,634 | 3/1970 | Waseleski, Jr. et al. ............... 251/11 |
| 3,550,901 | 12/1970 | McIntosh ............................. 251/38 |
| 3,709,460 | 1/1973 | McIntosh ............................. 251/11 |
| 3,873,059 | 3/1975 | Meckstroth .......................... 251/45 |
| 4,016,722 | 4/1977 | Niederer, Sr. ........................ 60/531 |

*Primary Examiner*—George L. Walton
*Attorney, Agent, or Firm*—Wayne B. Easton

[57] ABSTRACT

The invention relates to a valve assembly. A closure member for the valve unit is controlled directly or indirectly by a movable wall of an expansible chamber filled with a refrigerant medium having vapor and liquid phases. The pressure exerted by the vapor phase of the medium provides a bias which is directly related to the temperature of the liquid phase. A heat transfer element such as a heating resistor in the liquid phase is heated or allowed to cool in a controlled manner by an external control unit. A temperature responsive sensor element in the liquid phase of the medium is part of a feedback system for the control unit which allows a selected temperature to be maintained in the chamber which results in a desired constant pressure to be maintained in the chamber. A pilot valve unit is disposed between the valve closure member and the movable wall. An expansible chamber behind the closure member houses a spring for biasing in a valve closing direction. A bypass throttle passage has a first section extending from the valve inlet to the expansible chamber and a second section extending from the expansible chamber to the valve outlet. The pilot valve unit includes a valve element operably connected to the movable wall for controlling fluid flow through the second bypass section and thus control the opening of the valve closure element.

1 Claim, 6 Drawing Figures

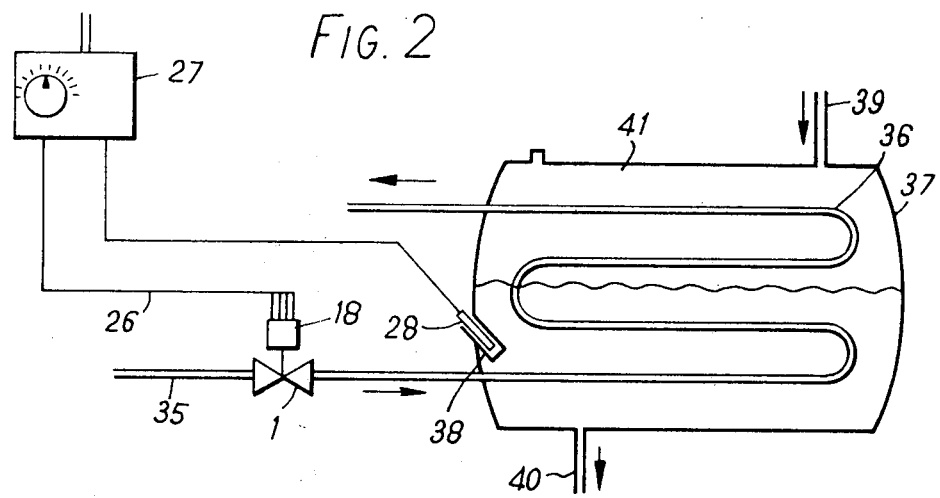
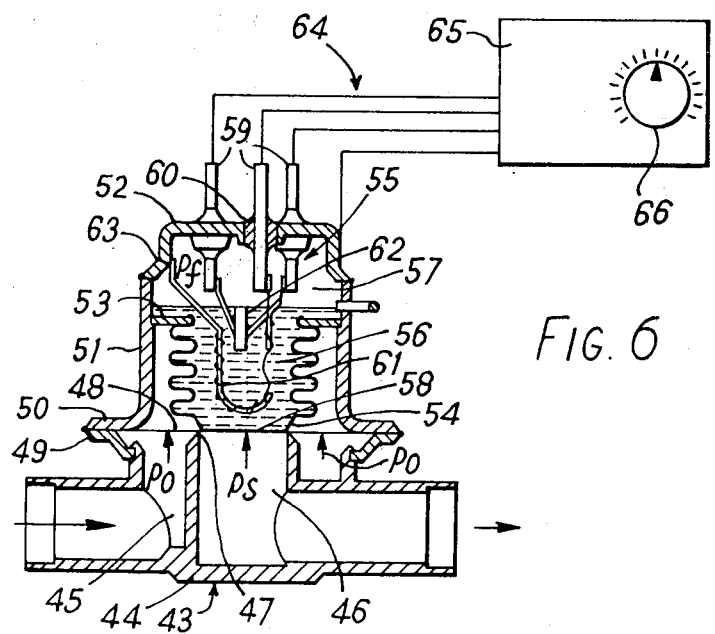

ACTUATING APPARATUS FOR ADJUSTING A MOVABLE ELEMENT, PARTICULARLY THE CLOSURE MEMBER OF A VALVE

This is a division of application Ser. No. 956,573 filed Nov. 1, 1978, now U.S. Pat. No. 4,258,899.

The invention relates to an actuating apparatus for adjusting a movable element, particularly the closure member of a valve, comprising a work chamber having an expansion medium, heating or cooling means supplying heat to or withdrawing it from the medium, a feedback temperature sensor, and a wall section which is displaceable by the medium, is biased by a counter-force and adjusts the movable element, and comprising a control unit which supplies the heating or cooling means with current in response to the fed back temperature and at least one further function such as desired value, guide quantity or the like.

In a known actuating apparatus of this kind, the work chamber is filled with an expansion liquid and closed at one side by a piston which is biased by a return spring and connected to a valve shank. The valve serves to control the temperature in rooms. The control unit supplies current to a heating resistor in the expansion liquid, the current depending on the fed back temperature of the expansion liquid, the measured air temperature in the room, and a set desired value for the air temperature in the room. Greater expansion of the liquid is obtained by more intensive heating and contraction of the liquid is obtained by dissipation of heat to the surrounding air.

Such actuating apparatuses work comparatively sluggishly. On the one hand, to achieve a predetermined stroke for the movable wall section it is necessary to heat a certain amount of the expansion liquid through a particular temperature difference, this requiring a predetermined amount of heat; on the other hand, only a limited amount of heat energy can be supplied by the heating resistor. In addition, the position of the movable element can be influenced only by means of this heating. By reason of this large time constant, one must also expect considerable hunting, at least in the case of simply constructed control units.

The invention is based on the problem of providing an actuating apparatus of the aforementioned kind that responds more rapidly and can therefore be more readily incorporated in control circuits.

This problem is solved according to the invention in that the work chamber is filled with a liquid/vapour mixture and that the control unit is so designed and the counter-force so selected that the wall section assumes positions of equilibrium under the influence of the temperature-dependent vapour pressure in the work chamber and the counter-force.

Such an actuating apparatus can operate more rapidly because the liquid to be heated or cooled occupies only part of the work chamber, lower temperature differences already suffice to bring about sufficiently large pressure differences, and in many cases the counter-force can be kept so small that small pressure differences in the work chamber already lead to adequate displacements of the wall section. By reason of the smaller time constant, the actuating apparatus is also more suitable for incorporation in regulating circuits. In addition, an adjustment is possible not only through a pressure change in the work chamber but also through a change in the counter-force, which can take place practically without time delay.

Altogether, one obtains an actuating apparatus which can be remotely set or controlled by the control unit and which is applicable for many purposes, such as the adjustment of valves, throttle flaps or the like.

With particular advantage, the displaceable wall section is formed by a flat diaphragm. Since the stroke of such a diaphragm is relatively small, the size of the vapour-filled part of the work chamber alters only slightly during operation. This means that only a very small amount of thermal energy is necessary for evaporation or condensation, whereby the speed of response is increased still further.

Such a small stroke is also obtained if a flat diaphragm forms the closure member of the valve. This is sufficient in many cases, for example when a valve seat of adequately large diameter is used which, in conjunction with the small stroke, defines an adequately large flow cross-section.

Another possibility of making do with a small stroke and thereby keeping the thermal energy for evaporation or condensation low resides in that the movable element is the closure member of a pilot valve in series with a throttle and that the pressure drop at the throttle controls a piston which is biased by a spring and serves to adjust the closure member of a main valve. This feature can also be combined with that of using a diaphragm as the displaceable wall section. In this way one can, for example, control liquid valves having comparatively large flow quantities.

It is in this case particularly favourable if the counter-force is at least partially produced by the spring biasing the piston. This spring brings about an internal return motion so that a more stable behaviour is achieved without having to interfere with the control unit or the regulating circuit.

Such an internal return motion can also be achieved in a valve with inverse characteristic if the counter-force is produced by a pressure opening the pilot valve and if the spring biassing the piston acts in the direction of the vapour pressure.

Applications are also favourable in which the counter-force is at least partially produced by a pressure which depends on the position of the movable element. In this case the work chamber can define a reference pressure which retains a constant value, rapid regulation being achieved in that upon a change occurring in the pressure depending on the movable element, the movable element is adjusted practically immediately.

The invention will now be described in more detail with reference to examples illustrated in the drawing, wherein:

FIG. 2 shows the use of this valve in a water-cooled condenser;

FIG. 6 is a cross-section of a valve having a further embodiment of the actuating apparatus according to the invention.

Figure 1:
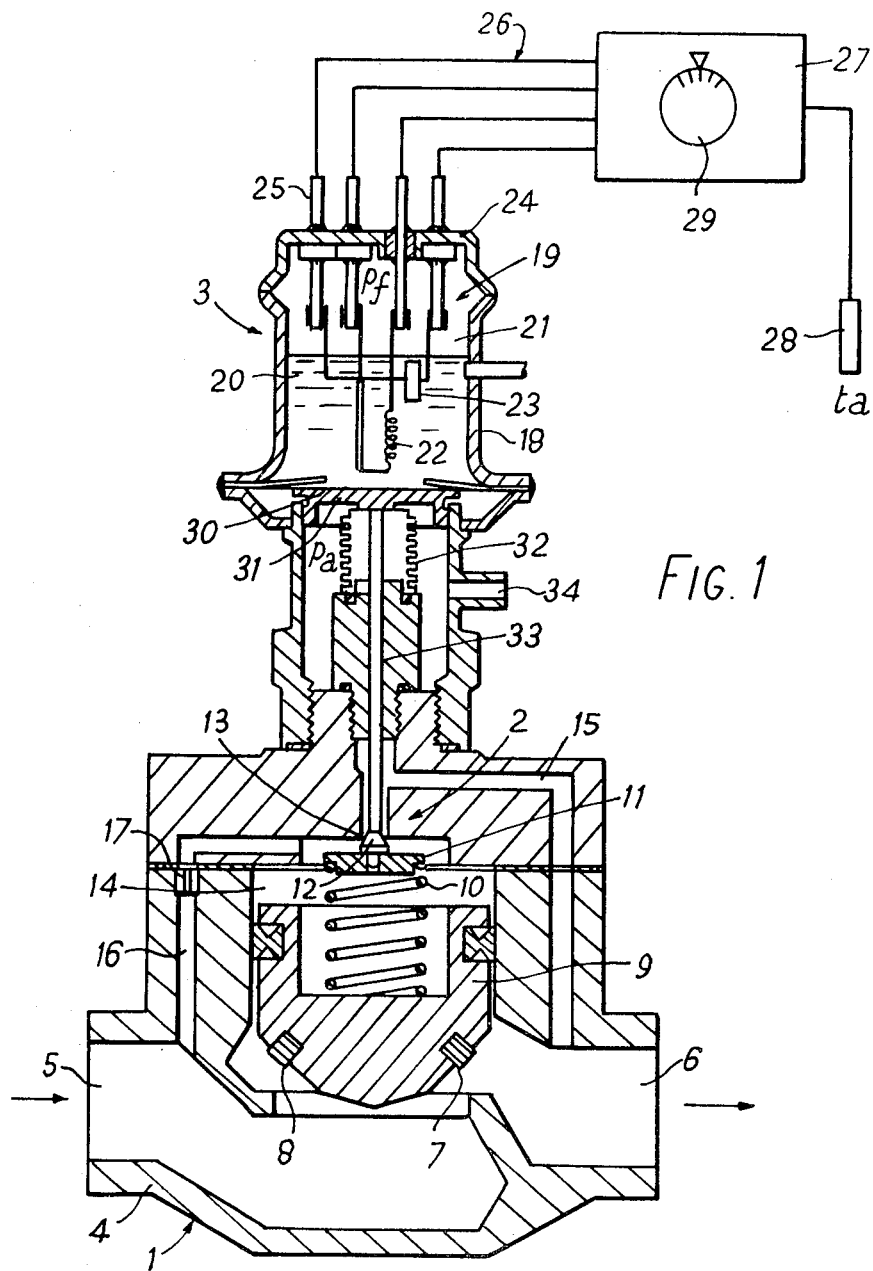
FIG. 1 is a cross-section through a liquid valve having an actuating apparatus according to the invention.

FIG. 1 illustrates a main valve 1 controlled by means of a pilot valve 2 which, in turn, depends on an actuating apparatus 3.

The main valve comprises a housing 4 with an inlet connection 5 and outlet connection 6 as well as a valve seat 7 disposed therebetween. A closure member 8 is in one piece with a piston 9 which is biassed by a spring 10. This spring is supported by a plate 11 which is coupled to the closure member 12 of the pilot valve. This closure member co-operates with a valve seat 13 which connects a pressure chamber 14 to an outlet passage 15. A throttle 17 is disposed in an associated inlet passage 16. The flow through the throttle 17 depends on the degree of opening of the pilot valve 2. The pressure drop at the throttle 17 produces a pressure difference which acts on the piston 9 from below and displaces same upwardly until a position of equilibrium is obtained as a result of compression of the spring 10.

In a capsule 18, the actuating apparatus comprises a work chamber 19 which is filled partially with liquid 20 and partially with vapour 21. In the work chamber there are heating means 22 in the form of a heating resistor and a feedback temperature sensor 23 in the form of an NTC resistor. By way of pins 25 which are insulatingly brought out through the base 24 of the capsule and corresponding conductors 26, these two elements are connected to a control unit 27 which supplies the heating means 22 with current depending on the signal of the feedback temperature sensor 23, the signal of an external temperature sensor 28 and a desired value that can be set by means of a rotary knob 29. The work chamber 19 is closed at the bottom by a displaceable wall section in the form of a diaphragm 30. The latter is clamped at the margin and supported in the middle by a plate 31. With the interpositioning of a corrugated tubular seal 32, the plate acts on a shank 33 which carries the closure member 12 of the pilot valve 2. An additional pressure can be applied by way of a nipple 34.

FIG. 2 shows one example of use. Here, the main valve 1 is connected in a water supply conduit 35 which is extended as a pipe 36 in a condenser 37. The external sensor 28 dips into a measuring pocket 38 provided in the lower portion of the condenser 37. Gaseous refrigerant is introduced to the condenser 37 by way of the conduit 39 and liquid refrigerant is led off by way of conduit 40. The nipple 34 is open to atmosphere.

This results in the following manner of operation: If the refrigerant temperature $t_a$ measured by the external sensor rises above the desired value set by the knob 29, there is more intensive heating of the heating means 22 which, with only a slight time delay, causes an increase in the pressure $p_f$ in the work chamber 19. This pressure is opposed on the one hand by the force of the spring 10 and on the other hand by the atmospheric pressure $p_a$ in the nipple 34. Accordingly, the closure member 12 of the pilot valve has a position of equilibrium which is displaced downwardly upon an increase in the pressure $p_f$ in the work chamber 19. Very small displacements are already sufficient to bring about a considerable change in the pressure drop at the throttle 17, whereby the piston 9 of the main valve 1 assumes a new position by wandering upwardly. This compresses the spring 10, whereby the closure member 12 and the diaphragm 30 are displaced upwardly even though the pressure $p_f$ has remained the same. This return motion avoids hunting.

Figure 3:
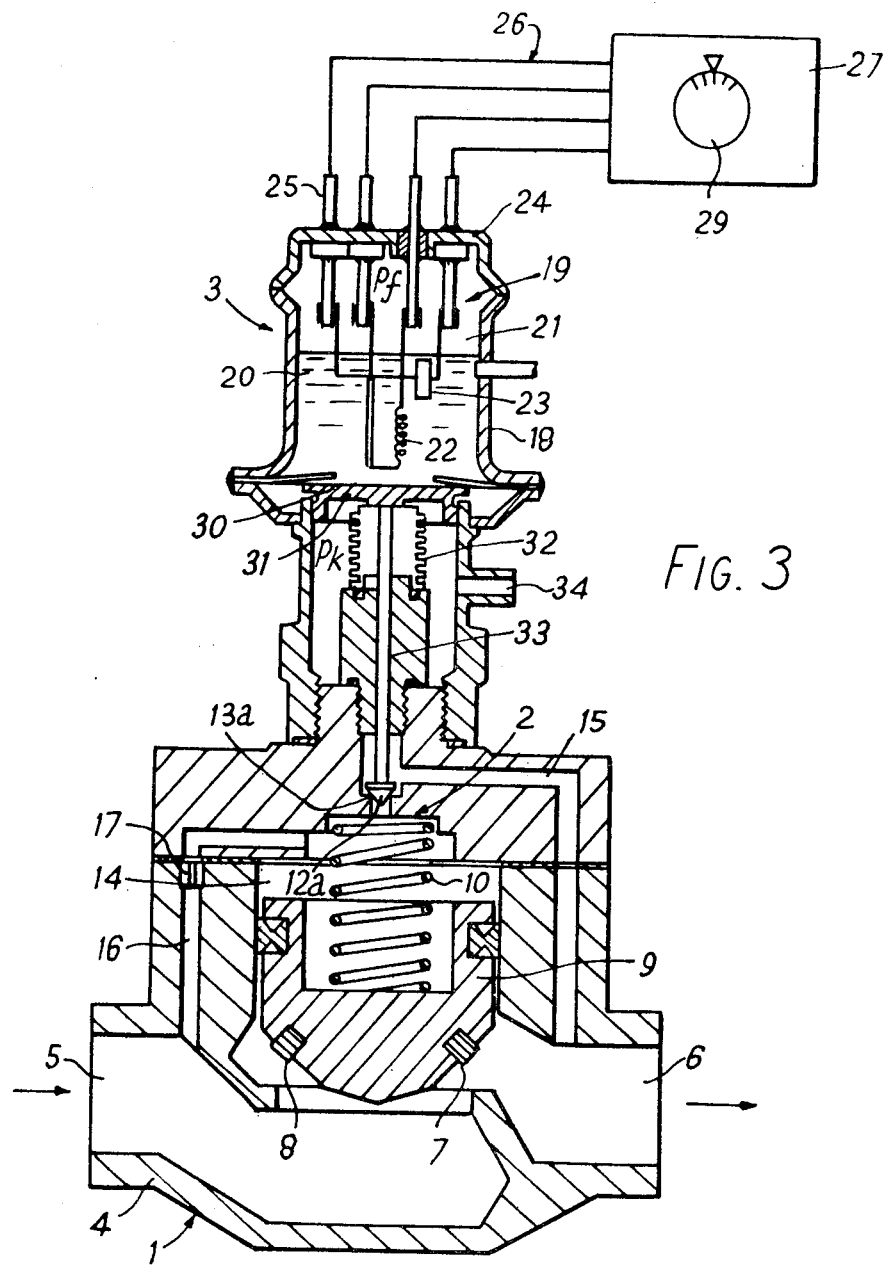
FIG. 3 is a cross-section through a different embodiment of liquid valve.
Figure 4:
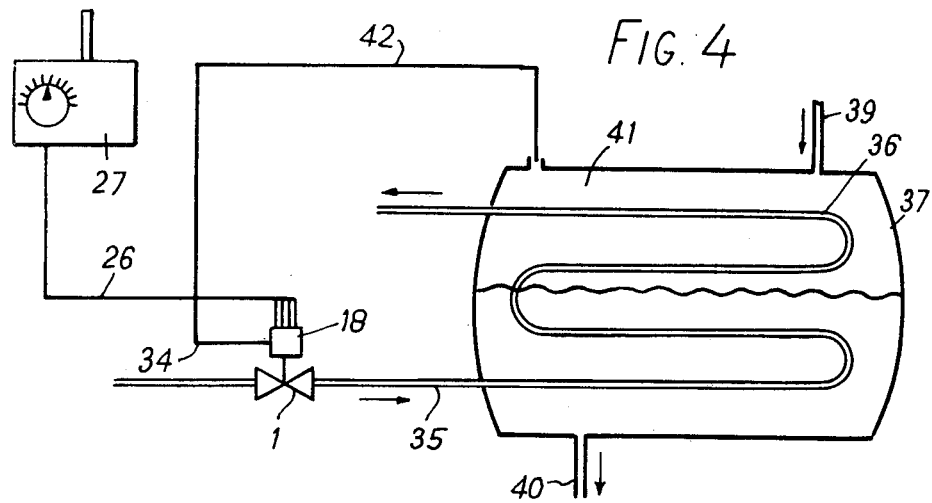
FIG. 4 shows the use of the FIG. 3 valve.

FIGS. 3 and 4 show a different embodiment of the invention. Here, the control unit 27 is used to set and keep constant the filling pressure $p_f$ which in this case forms a reference pressure, the condenser pressure $p_k$ being supplied as a control pressure through the nipple 34. The valve has the same construction as that in FIG. 1 and therefore the same reference numerals are employed. Only the closure member 12a of the pilot valve which co-operates with the valve seat 13a operates in the opposite direction to the pilot valve of FIG. 1. With an increase in pressure $p_f$ in the work chamber 19, the pilot valve closes and with an increase in the pressure $p_k$ the pilot valve opens. The nipple 34 is connected to the vapour chamber 41 of the condenser 37 by way of a conduit 42 in order that the condenser pressure $p_k$ is effective beneath the diaphragm 30. Under these conditions, the external temperature sensor 28 is dispensed with.

The resulting manner of operation is as follows: If the pressure in the condenser 37 rises, so will the pressure $p_k$ at the nipple 34. This opens the pilot valve. The closure member 12a is displaced upwardly. A very small displacement will suffice to bring about a considerable change in the pressure drop at the throttle 17, whereby the piston 9 of the main valve assumes a new position by wandering upwardly.

Figure 5:
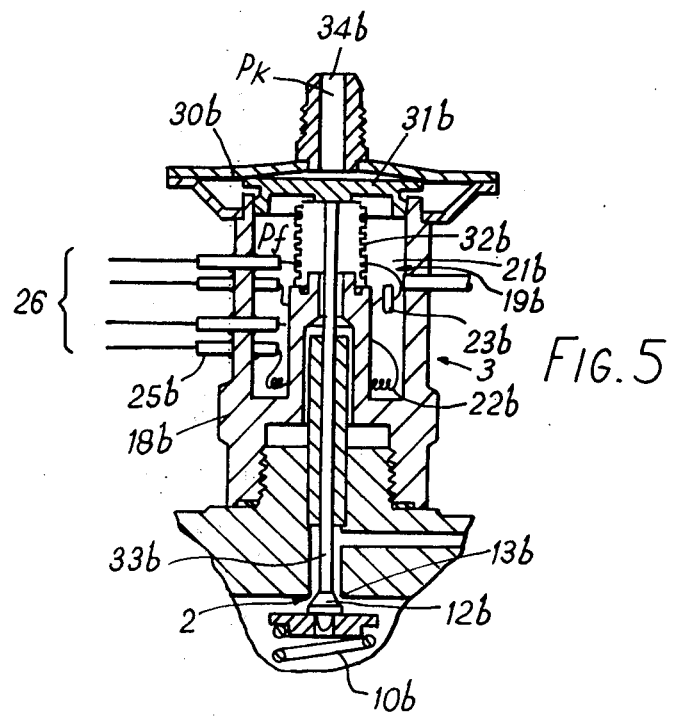
FIG. 5 is a cross-section through part of a further liquid valve.

In the FIG. 5 embodiment, the main valve corresponds to that of FIG. 1. Consequently, only the actuating apparatus 3b for adjusting the pilot valve 2 is illustrated. In this case, the work chamber 19b is disposed beneath the diaphragm 30b, whereby a rising pressure $p_f$ effects closure of the pilot valve. The other parts correspond to those in FIG. 1 and their reference numerals have the suffix b only because they have a different position. This construction can operate in the same way as the FIG. 3 embodiment if the nipple 34b is connected to the vapour chamber 41 of the condenser. However, an advantage resides in the fact that return motion is effected by way of the spring 10 in the same way as in FIG. 1.

In the embodiment according to FIG. 6, a valve 43 is illustrated which can be disposed in the suction conduit of a refrigeration plant, i.e. traversed by refrigerant in vapour form. The valve 43 comprises a housing 44 with an annular inlet passage 45 and a control outlet passage 46 separated from each other by a valve seat 47. A diaphragm 48 which also serves as the closure member is secured between a flange 49 of the housing and a flange 50 of a capsule 51. The latter is closed at the top by a dished cover 52. The capsule 51, the cover 52, an annular disc 53 and bellows 54 define a work chamber 55. The latter is filled with a two-phase medium having the liquid phase 56 and a vapour phase 57. The base 58 of the bellows 54 has the same cross-sectional size as the valve seat 47 and rests on the diaphragm 48. Three pins 59 pass through the cover 52. Glass insulation 60 simultaneously serves as a seal. A heating resistor in the form of a coil of resistance wire is disposed in the liquid phase to serve as heating means 61 and an NTC resistor is disposed in the liquid phase to serve as a feedback temperature resistor 62. These elements are connected to a control unit 65 by way of the three pins 59 and a connection 63 fixed with respect to the housing as well as by way of conductors 64. The control unit has a rotary knob 66 for setting a desired value for the pressure $p_f$ existing in the work chamber 55.

Accordingly, a constant pressure $p_f$ exists in the work chamber 55 and acts on a pressure face defined by the base 58. In the opposite direction, the evaporator pressure $p_o$ acts on the outer annular face and, to a much smaller extent, the suction pressure $p_s$ acts on the central circular face of the diaphragm 48. This creates a condition of equilibrium. If the evaporator pressure $p_o$ rises, the diaphragm 48 is lifted further off the valve seat 47 so that the evaporator pressure drops again. In this way the evaporator pressure is kept substantially constant.

The two-face filling medium is selected so that in the condition of equilibrium it has a higher temperature than the refrigerant and than the ambient temperature. If the evaporator pressure is to be increased, the temperature of the liquid phase 56 is raised by more intensive heating. If on the other hand the evaporator pressure is to be reduced, the liquid phase 56 and the vapour phase 57 can assume a lower temperature by dissipating heat to the refrigerant and the ambient temperature, so that the vapour pressure $p_f$ drops. The vapour pressure thus set will then always remain the same irrespective of how far the valve has to open in order to maintain the desired evaporator pressure.

Many departures can be made from the illustrated examples without departing from the inventive concept. For example, the FIG. 1 valve can also be used for liquids other than water, e.g. for sols or it can also be used for gases. The control unit can also take other functions into account. For example, for the purpose of rapid return motion the closure member of the main valve in FIG. 1 can be provided with a path generator feeding back the stroke. Suitable cooling means are for example Peltier elements.

What is claimed is:

1. A valve assembly, comprising a housing defining an inlet and an outlet and a valve opening therebetween, a closure element for said valve opening, said housing and said closure element forming an expansible operating chamber, bypass passage means in said housing having a first section extending from said inlet to said operating chamber and a second section extending from said operating chamber to said outlet, throttle means in said first section, pilot valve means including a valve element for modulatingly controlling fluid flow through said second section from said operating chamber to said outlet, said housing defining an expansible control chamber having an upper movable wall formed by a flat diaphragm, said control chamber having a cylindrically shaped upper internal surface, a piston plate attached to the underside of said diaphragm and slidingly and sealing engaging said upper internal surface of said control chamber, rod means extending between said piston plate and said valve element, sealing means between said rod means and the interior of said control chamber, a liquid/vapor type filling for said control chamber biasing said diaphragm in a direction to expand said control chamber and move said valve element in a closing direction, port means in said housing for admitting pressurized control fluid to the upper side of said diaphragm for contracting said control chamber and moving said valve element in an opening direction, electric heating means and temperature sensor means in said control chamber, electric contact means extending from outside said housing to the interior of said control chamber connected to said heating means and said temperature sensor means, and resilient biasing means in said operating chamber between said closure element and said valve element to provide a supplementary force relative to the pressure in said operating chamber, and control means connected to said electric control means for reading the temperature of said filling and for selectively turning on said heating means to cause said pilot valve means and said closure element to assume predetermined intermediate positions of stable equilibrium corresponding to a controlled range of pressures in said control chamber.

* * * * *